United States Patent [19]

Keener et al.

[11] Patent Number: 5,204,951
[45] Date of Patent: Apr. 20, 1993

[54] APPARATUS AND METHOD FOR IMPROVING THE COMMUNICATION EFFICIENCY BETWEEN A HOST PROCESSOR AND PERIPHERAL DEVICES CONNECTED BY AN SCSI BUS

[75] Inventors: Don S. Keener, Boca Raton; Andrew B. McNeill, Deerfield Beach; Edward I. Wachtel, Boca Raton, all of Fla.

[73] Assignee: International Business Machines Corporation, Armonk, N.Y.

[21] Appl. No.: 416,210

[22] Filed: Oct. 2, 1989

[51] Int. Cl.5 .............................................. G06F 13/36
[52] U.S. Cl. ............................ 395/325; 364/DIG. 2; 364/935.41
[58] Field of Search ............... 364/200, 900, DIG. 1, 364/DIG. 2; 395/200, 275, 325, 725, 425

[56] References Cited

U.S. PATENT DOCUMENTS

| | | | |
|---|---|---|---|
| 4,156,907 | 5/1979 | Rawlings et al. | 364/200 |
| 4,218,740 | 8/1980 | Bennett et al. | 364/200 |
| 4,229,791 | 10/1980 | Levy et al. | 395/275 |
| 4,292,669 | 9/1981 | Wollum et al. | 364/200 |
| 4,378,588 | 3/1983 | Katzman et al. | 364/200 |
| 4,418,382 | 11/1983 | Larson et al. | 364/200 |
| 4,449,183 | 5/1984 | Flahive et al. | 395/425 |
| 4,514,808 | 4/1985 | Murayama et al. | 364/200 |
| 4,787,033 | 11/1988 | Bomba et al. | 395/325 |
| 4,805,137 | 2/1989 | Grant et al. | 395/325 |
| 4,965,801 | 10/1990 | Dulac | 395/275 |

FOREIGN PATENT DOCUMENTS

| | | | |
|---|---|---|---|
| 8303507 | 10/1983 | European Pat. Off. | 395/325 |
| 0124806 | 4/1984 | European Pat. Off. | 395/325 |
| 0137761 | 9/1984 | European Pat. Off. | 395/325 |

Primary Examiner—David L. Clark
Assistant Examiner—John C. Loomis
Attorney, Agent, or Firm—G. E. Grosser; G. R. Pettit

[57] ABSTRACT

Apparatus and method for increasing efficiency of command execution from a host processor over an SCSI bus. Arbitration, selection and message out functions of SCSI protocol are implemented using a background arbitration state machine. Additional protocol functions are implemented in a foreground state machine. When the host processor issues a command for access to the SCSI bus, the background state machine can be programmed before the foreground machine completes the protocol function for a previous command. Thus, the background state machine is ready to arbitrate for access to the bus at the very next bus free condition.

14 Claims, 4 Drawing Sheets

APPARATUS AND METHOD FOR IMPROVING THE COMMUNICATION EFFICIENCY BETWEEN A HOST PROCESSOR AND PERIPHERAL DEVICES CONNECTED BY AN SCSI BUS

The present invention is directed to devices which communicate over a small computer system interface (SCSI) bus. Specifically, a technique is provided to enhance selection/reselection efficiency between a host SCSI device connected to the SCSI bus and peripheral devices connected to the bus such as disk drives, printers, etc.

Currently available small computer systems include an SCSI bus which links various peripheral devices to the host processor. The host processor is connected to the SCSI bus through an adapter. The communication protocol for these systems is based on the use of arbitration to resolve any contention for access to the bus by multiple devices. The arbitration depends on each of the devices having a unique address, as well as priority. A device seeking access to the bus will assert its address on the bus by asserting a corresponding one of the data bus lines. The data line positions establish a priority among the devices with data bit 7 having the highest priority.

The host processor (through the adapter) contends for access to the SCSI bus on the same basis as the other peripheral devices, although the adapter usually has the highest priority. When a command from the host processor is issued to communicate with a peripheral device, the adapter connected between the host processor and SCSI bus contends for access to the bus.

When the adapter gains access to the bus, a select/reselect phase of the protocol takes place. The select phase represents the time in which a communication link between the host device and a selected peripheral device is established, followed by optional message phases and the transmission of a command and possible additional phases to the target peripheral device.

Following receipt of the command, the peripheral device will normally either transfer data and disconnect from the SCSI bus, or disconnect immediately from the SCSI bus. The device disconnects to allow other devices to gain access to the SCSI bus while it takes action on the command, e.g., prints information received in the case of a print command to a printer or seeks to an appropriate cylinder and gathers data in the case of a read command to a hard disk. Following this disconnection by the peripheral device, the host SCSI device may want to participate in the next arbitration to begin a command on another device. Once the command is processed, the peripheral device enters a reselect phase by arbitrating for and gaining access to the bus. When the bus is acquired, the peripheral device will establish a communication link with the host processor initiator via the adapter, and forward a response to the host adapter.

Once the disk drive reselects by initiating an arbitration for reselection, and acquires the bus, the bus is maintained busy until the disk drive has completed its transfer of requested data and status.

The host device is effectively inhibited from issuing any other commands once another device has acquired the bus. If the adapter is unable to set up for a subsequent arbitration to gain access to the bus, and issue another command to another peripheral device before a previously selected device reselects the host, subsystem performance is reduced due to poor command overlap. The operation becomes particularly inefficient when a waiting peripheral device, e.g., a hardfile which has just completed its seek, or a second initiator of lower priority gains access to the bus as soon as the bus goes free following disconnection.

In order to request the bus, the adapter logic must be configured with the new selection data, including a request to arbitrate for access to the bus, the identity of the target, and the identity of the logical unit for which access is desired. The preparation for carrying out the selection requires that any previous selection or reselection be completed.

The time required for the adapter microcontroller to set up for selection permits another device to arbitrate and win access to the bus. The adapter may therefore have to wait for another bus free period on the bus in which to gain access to the bus. Thus, the host processor effectively loses its priority status until the next bus free, and command overlap time is reduced.

In other words, in the case of an initiator, once a select operation concludes, the time at which the target attempts a reselect is arbitrary. If the adapter is engaged in setting up another select operation when the target attempts the reselect, the fact that the adapter is engaged will allow the period for arbitration to pass without the adapter engaging in the arbitration. As a result, the target may well be successful in winning the arbitration. If successful, the target will then commence to transfer data to the adapter. This can well be a lengthy process during which no other device is engaged in executing a command because the adapter never got a chance to execute a further select operation.

In one prior art solution to this problem, the adapter initiates a BUSY condition on the bus while it sets up for selecting another device. This prevents any other device from contending for access on the bus. However, the solution effectively delays command delivery and inhibits use of the bus during the setup time, thus reducing the total system efficiency.

SUMMARY OF THE INVENTION

It is an object of the invention to provide a host processor in an SCSI system with the ability to acquire the SCSI bus for initiating subsequent tasks to several devices before allowing another device access to the bus.

It is a general object of this invention to permit a host adapter to effect multitasking (or to implement multithreaded operations) with a plurality of devices connected to an SCSI bus.

The invention solves the problem outlined by providing a background state machine which executes the arbitration function. With this task removed from what is now termed the foreground machine, the difficulty outlined above is overcome. More particularly, assume that the adapter has completed a setup for a future arbitration and a target waits to attempt a reselect operation while the bus is busy. Because the background machine is continuously available when the bus free state occurs and the target attempts to arbitrate, the adapter, through the background machine, can engage in the arbitration. Since the adapter has a higher priority, it is assured of winning the arbitration and allowing the foreground machine to transmit whatever command has been queued. Only after the adapter has initiated other devices into operation will another device win a subsequent arbitration. As a result, while the lengthy data transfer from target to adapter is in process, other devices may be engaged in locating data that has been requested of them. In other words, with use of the background arbitration of the invention, the likelihood for multitasking or multithreaded operations on the SCSI bus is increased.

These and other objects of the invention are provided with a host processor adapter capable of being set up to select other devices on the SCSI bus while currently executing previous selection commands. This ability is termed background arbitration. With the use of background arbitration, if the processor issues other commands requiring access to one of a plurality of SCSI connected devices while a previous command is being executed, the selection may be programmed in the background state machine portion of the adapter. The background arbitration feature will insure that the adapter can participate in every arbitration for bus access as soon as the previous selection or reselection of the adapter is completed. The adapter may be executing a previous selection command, or waiting for selection/reselection, and at the same time set up to arbitrate for access to the bus when the bus subsequently enters the free state.

Using background arbitration, it is possible for the adapter to initiate a series of commands to different peripheral devices. The adapter participates in every arbitration, and because of its priority over other devices connected to the SCSI bus, wins each arbitration. Thus, all host processor initiated commands are sequentially forwarded to the respective peripheral devices before any device can select or reselect any other device.

The advantage of background arbitration is in effecting multitasking. The background arbitration permits the host processor to command all peripheral devices without interruption from a device which reselects the host adapter, thus tying up the bus and inhibiting the host adapter from initiating any other tasks. Since future selection commands are set up while current selection commands are being executed, the required time to set up a selection is reduced, avoiding the necessity to assert a BUSY condition on the bus to prevent another device from gaining access to the bus.

In carrying out the invention in accordance with the preferred embodiment, the arbitration function, selection function, and message out function are carried out by a background state machine which forms part of the adapter. The remaining SCSI protocol functions are carried out by a foreground machine (also part of the adapter) which will provide the related command out data once the background machine has established a link with a selected target. It is also possible to incorporate other SCSI protocol functions, i.e., phases in the background state machine.

The use of two state machines to carry out the SCSI protocol permits one machine (background) to be programmed with future arbitration, selection, and message out functions, while the other (foreground) machine forwards to a connected device the command or transfers data between the host and the selected device. When the bus free state occurs, the background state machine is free to arbitrate for access to the bus, and establish communication with another peripheral device.

DESCRIPTION OF THE PREFERRED EMBODIMENT

Figure 1:
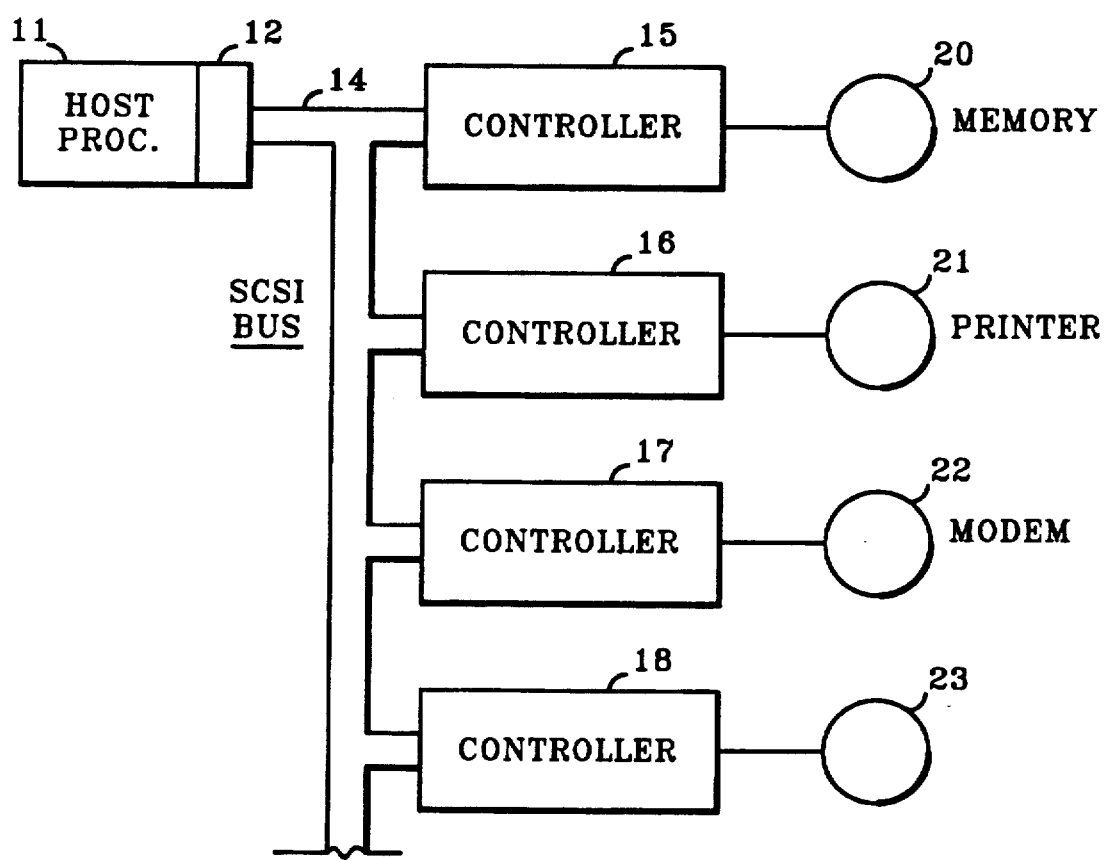
FIG. 1 illustrates an SCSI bus structure connecting a host processor to a plurality of controllers.

Referring now to FIG. 1, there is shown the general organization of an SCSI bus 14 connecting a host processor 11 to a plurality of controllers 15-18. The host processor 11 includes an adapter 12 which receives commands from the host processor 11, as well as traffic from the SCSI bus 14 destined for the host processor 11.

Each of the controllers 15-18 is connected to the bus 14 and to a peripheral device 20-23. The peripheral devices may be a disk memory, printer, modem or other commonly used data processing peripheral device. With the SCSI bus, up to eight SCSI devices can be supported. Each controller may support more than one device.

With the SCSI bus structure shown in FIG. 1, each of the devices 20-23 and the host processor 11 may be an initiator or a target for commands issued from the host processor 11 or devices 20-23. The information transfer across the SCSI bus is asynchronous or asynchronous. A particular REQ/ACK protocol issued. For synchronous transfer, one byte of information is transferred with each handshake on the SCSI data bus. For synchronous transfer, a count of the number of REQs and ACKs is maintained, but REQUEST and ACKNOWLEDGE signals do not have to be interleaved.

Communication over the SCSI bus is effected by having a device with information to convey contend for access on the SCSI bus. Using the standard SCSI protocol, each device will first detect whether or not a busy condition exists on the SCSI bus. Contention for the bus is inhibited until the SCSI bus is in a non-busy state. Once the non-busy state is detected, each of the controllers and the host processor, through adapter 12, may contend for access on the bus by asserting its address on the bus.

A hierarchy is established for each of the controllers 15-18 and the host processor 11. The host processor 11 is normally given the highest priority such that when it arbitrates with other devices having traffic for the SCSI bus, the host processor 11 will win the arbitration.

In current SCSI protocol operation, the host processor will, if desiring to communicate with one of the controllers 15-18, connected to a specific peripheral device 20-23, contend for access to the SCSI bus. Having won the arbitration because of its priority, the host processor 11 can then select the particular controller 15-18 for which its command is destined.

Once a controller 15-18 recognizes a selection from the initiator, in this case, the host processor, the device having recognized the selection will request transfer of the particular message, command, data and/or status information.

In the case of controller 15, it will receive requests from the host processor 11 for data stored on the disk memory 20. After receiving from the host processor the particular command which the host processor is requesting the SCSI bus is freed up. The controller 15 and disk memory 20 will search for and retrieve the requested data.

Once the controller 15 and disk memory have accessed and retrieved the required data for transfer to the adapter 12, the controller 15 will arbitrate for access to the bus 14. If the controller 15 is successful in acquiring the bus, and executing the RESELECT function, the required data will be transferred to the host processor 11 via adapter 12.

The disadvantage of this protocol is that the host processor 11, and indeed any other device connected to the SCSI bus may not access the bus and therefore the bus will be tied up until the controller 15 has completed its data transfer. Any commands the host processor 11 has for other controllers 16, 17 or 18 must wait until the controller 15 has completed its transfer of requested data.

Thus, the host processor 11 and other controllers 16, 17 and 18 and their associated peripheral devices 21, 22 and 23 remain idle until the data has been completely transferred from the memory of disk drive 20 to the host processor 11.

Using a background arbitration technique according to the present invention, it is possible for the background arbitration state machine to arbitrate with a new selection operation and win (and therefore suppress) a reselect operation by virtue of the adapter's higher priority. Thus, if host processor 11 issues a subsequent command for another device 21, 2 and 23 while controller 15 is executing a command previously issued by the host processor 11, using background arbitration, the adapter 12 will arbitrate for access to the SCSI bus, as soon as the target 15 disconnects and allows the SCSI bus to go free. The background arbitration will insure access by the host processor 11 to the SCSI bus, inhibiting controller 15 from reselecting the host processor 11 when the host 11 has other commands destined for controllers 16, 17 and 18. Using background arbitration, the host processor 11 will participate in every arbitration which occurs when the host processor issues any command for any of the devices connected to the SCSI bus, and the background machine has been enabled.

Figure 2:
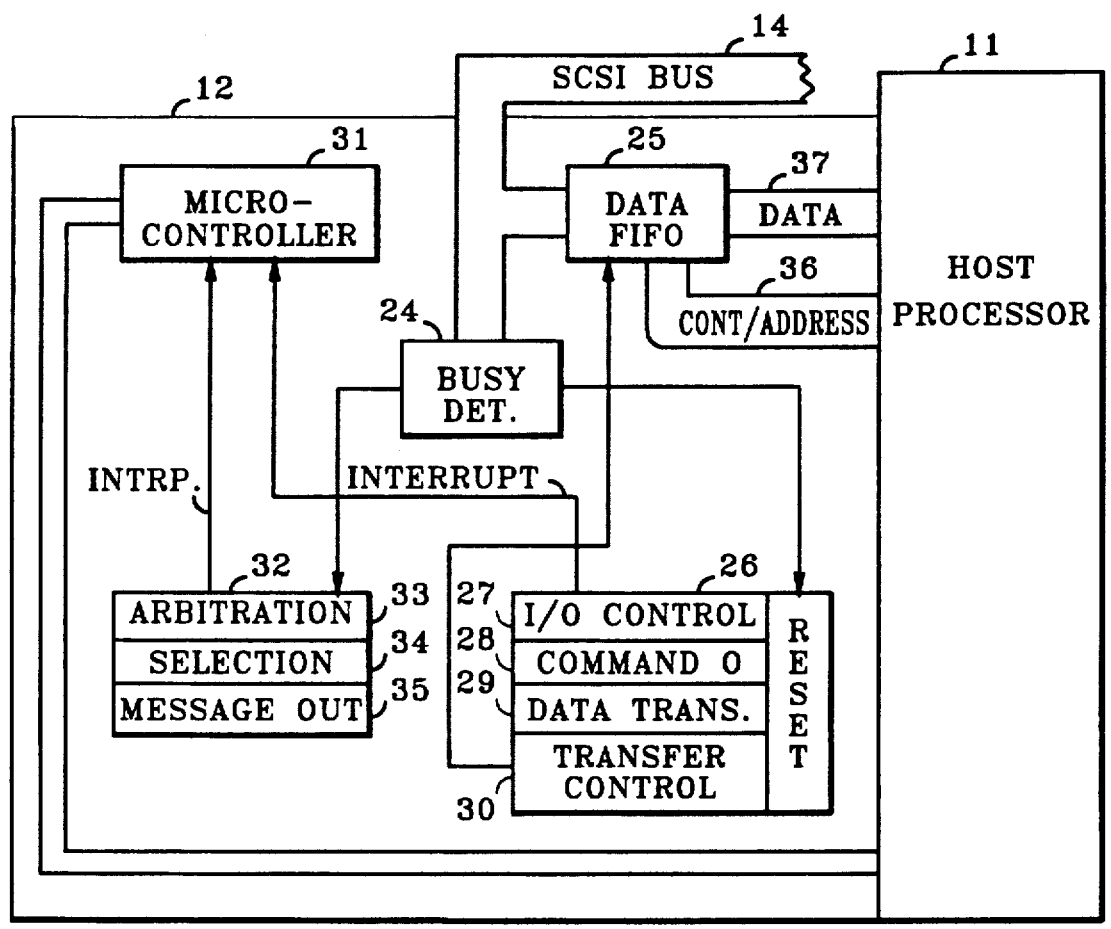
FIG. 2 illustrates the structure of the adapter hardware.

FIG. 2 illustrates a model the which contains the background state machine 32 and foreground state machine 26. These state machines execute all the protocol functions for communicating over the SCSI bus, whereas formerly they were combined and programmed by the adapter microcontroller 31 as a single entity. The use of the two separate state machines will permit a first SELECT or RESELECT function to be executed to carry out SCSI protocol functions in the foreground state machine 26, while the background state machine 32 is being set up for a subsequently issued command.

The background state machine of the preferred embodiment includes three registers, 33, 34 and 35. The first of these registers 33 is set with a bit for carrying out the arbitration function. The second of these registers, 34, contains data identifying the selection function. The selection function is the address of a connected controller 15, 16, 17 or 18 to which the host processor 11 desires to communicate. The message out register 35 contains the identity of the logical unit associated with a particular device 20, 21, 22 or 23. A communication link between the adapter 12 and one of the peripheral devices 15, 16, 17 or 18, is effected by the programmed background state machine.

The foreground state machine 26 is shown to include an I/O control register 27, a command out register 28, an automatic data command register 29, and a transfer count register 30. The foreground state machine 26 is programmed by the microcontroller 31 with command out data, once the background state machine generates an INTERRUPT to the microcontroller indicating that the connection with a peripheral device is completed. Once the background state machine 32 has established a communication link with a connected peripheral device 15, 16, 17 or 18, the foreground state machine 26 is programmed and activated by the microcontroller 31 to cause COMMAND OUT data from register 28, which may be 6, 10 or 12 bytes long, is applied to the SCSI bus 14. It is this command data that the connected peripheral will interpret and generate a response for transmission back to adapter 12 over the SCSI bus 14. The data transfer counter 29 will control the data FIFO 25 to store data received from the SCSI bus as 8-bit increments. A transfer count register 30 will count the data coming back from SCSI bus 14 to compare the received data count with a predetermined data count, and therefore identify any errors in transmission. The I/O control register 27 is used by the microcontroller 31 to control the foreground machine 26. These foreground functions 26 are present in the current prior art implementations of SCSI protocol.

It should be recognized that some of the foreground functions, i.e., phases, can be incorporated in the background state machine. These include command out, data out, data in, message in, and status in. Similarly, message out could be implemented in the foreground machine rather than in the background state machine as is now preferred.

It is clear that once the background state machine 32 establishes a communication link with a given peripheral device 15-18, the foreground state machine 26 can be enabled in response to an INTERRUPT from the background state machine. At this point, the remaining protocol functions are executed by the foreground state machine 26.

If an command is generated by host 11, requesting access to another device connected on the SCSI bus, the background state machine can be programmed with arbitration, selection and message out associated with this subsequent command. As soon as the foreground state machine 26 completes execution of the first command by transferring command out data at the request of the target device, the SCSI bus becomes free. The busy detector 24, upon sensing the free condition of the SCSI bus 14 can initiate the background machine to begin an arbitration for access thereto based on the prior setup of the background state machine 32. Thus, the adapter 12 participates in the very next opportunity to arbitrate for access to the SCSI bus.

This, of course, maintains priority with the adapter 12 and host 11. Before controller 15, or any other controller, can respond with a RESELECT to the initial command issued by the adapter 12, the adapter 12 has obtained the bus and may access any other device.

Only when the adapter 12 has no need for access to the SCSI bus will the remaining devices 15-18 be able to arbitrate and win access of the SCSI bus.

It will be apparent that the foregoing technique permits multitasking. The host processor 11 can download all its requests to peripheral devices 15, 16, 17 and 18. Thus, it is not possible for any device to respond with a reselection and occupy the SCSI bus for a lengthy period of time in which traffic from the host processor 11 is held in abeyance.

Figure 3:
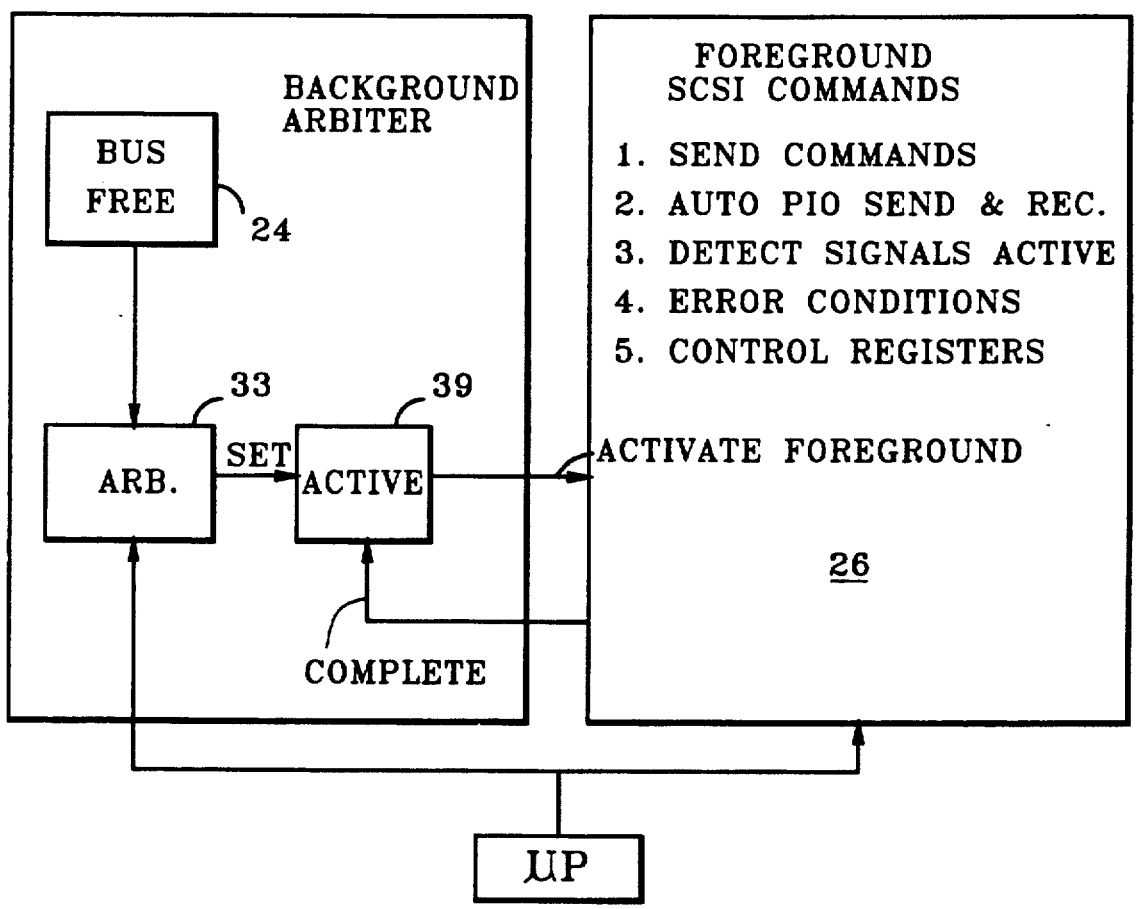
FIG. 3 illustrates the hardware function of the background state machine with the standard foreground logic for communicating over the SCSI bus.

FIG. 3 illustrates the background state machine and foreground state machine in the adapter 12. The bus free detector 24 is shown which will permit arbitration to begin when the SCSI bus is detected to be free. If an arbitration occurs and is won, the active latch 39 is set, permitting the foreground state machine to be programmed to complete the required protocol. At this time, the arbitration register 33 becomes free to receive subsequent requests for connection. The next subsequent request can be set up in the arbitration register 33, awaiting completion of execution of earlier processor initiated commands by the foreground state machine. Once the foreground state machine has completed the remaining protocol functions, the active latch 39 is reset.

Figure 4:
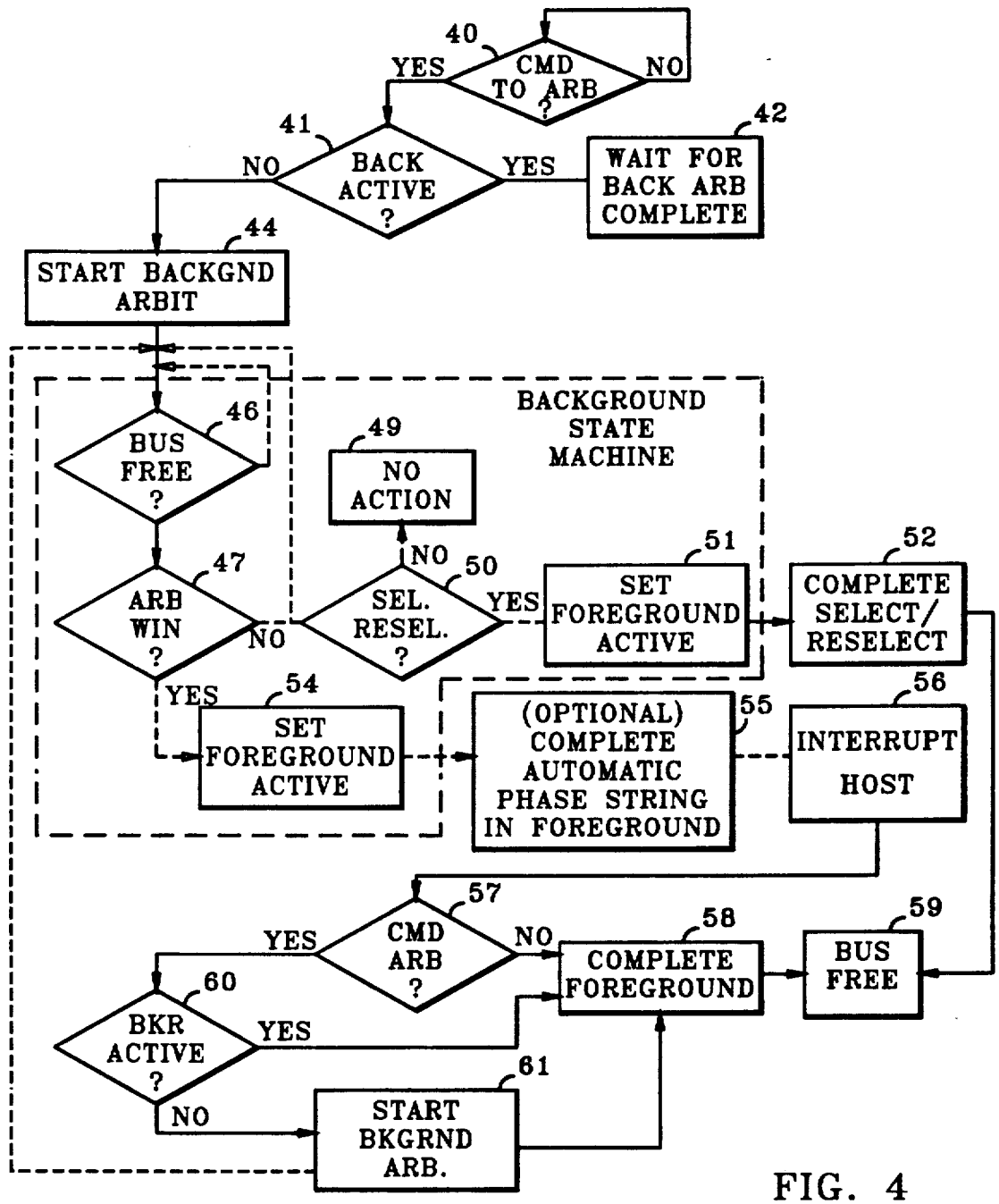
FIG. 4 is a flow chart illustrating how the background arbitration firmware interacts with the background and foreground logic.

The entire operation of setting up for background arbitration under control of microcontroller 31 is shown in FIG. 4. In this Figure, decision block 40 detects when the host processor 11 has issued a command requiring arbitration for access to the SCSI bus. The decision block 41 will check to see whether or not the background arbitration state machine is active, as having been set with an earlier request to arbitrate and select a given peripheral device. If it has been so previously selected, the later issued commands to arbitrate and select are stored in a queue 42 until the background arbitration registers become available for receiving the new ARBITRATION, SELECT and MESSAGE OUT data. If the background arbitration sate machine is inactive, the state machine is programmed, step 44, with a message byte, a device identity and a bit indicating that arbitration is to occur.

Once the background state machine completes a connection with a peripheral device, step 55, it is possible to identify the related command out data, status, and protocol information for the foreground machine using a lookup table. The identified data is inserted in the foreground machine by the microcontroller once the background machine has completed selection of the target device.

For the background state machine to start arbitration, the bus is determined to be free in step 46. Once the bus is determined to be free, arbitration occurs using the data stored in the background state machine. As the host processor normally has a higher priority than other devices connected to the SCSI bus, it is presumed that it would win. The background arbitration state machine then executes the SELECT function to establish a link with the desired peripheral device.

At this time, the foreground state machine can be set ACTIVE, step 54, and the automatic MESSAGE OUT function can occur, step 55. Once the SELECT is complete and MESSAGE OUT data has been transferred to the connected peripheral device the microcontroller 31 is interrupted step 56. Foreground protocol which is not automatic is then completed, step 58. Thus, if data from a connected disk memory is required, the commands from register 28 will identify the data, as well as the requirement to forward it to the adapter 12.

The adapter 12, via its microcontroller 31, will determine whether or not any subsequent command has been issued from the host processor 11 and is waiting to be placed in the background arbitration state machine 32, step 57. If not, the foreground state machine completes its processing of the earlier command, step 58.

If there has been a command to arbitrate, the background arbitration latch is checked in decision block 60 to see whether or not it is active, as in decision block 41. If it is active, this requires that the foreground state machine complete processing of the earlier command step 58.

If it is not active, the background arbitration is started in step 61 by setting up the background state machine to execute the functions of ARBITRATE, SELECT and MESSAGE OUT. After setting up the background state machine, the current active command requiring execution in the foreground state machine is executed step 58.

In the event the adapter does not have the highest priority, it could lose the arbitration. In that event, the adapter will wait for the next BUS FREE condition and arbitrate again. Decision block 50 will determine if the adapter has been selected or reselected by a higher priority device if the adapter has not won the arbitration. If the adapter has been selected or reselected, the foreground machine is set active and the microcontroller is interrupted. The microcontroller completes the select/reselect response by using the foreground machine. Once the select/reselect response is completed in step 52 by the foreground machine, the BUS FREE condition is detected in step 59, and arbitration is begun following decision 46.

Thus, it is clear that with the foregoing two state machines, background and foreground, it is possible to divide up the SCSI protocol functions in a manner which will permit a subsequent command for access to a peripheral device on the SCSI bus to be set up before completion of a first of such commands. By presetting the ARBITRATION, SELECTION and MESSAGE OUT functions in the background state machine, the adapter 12 is insured of participating in every arbitration which occurs. In this way, the host can, on a priority basis, without imposing any artificial delays on the SCSI bus 14, download all requested commands to the respective peripheral devices. Thus, peripheral devices never have an opportunity to reselect the host processor and engage in lengthy responses, thereby inhibiting the processor 11 from accessing other peripheral devices.

Thus there is described with respect to one embodiment of the invention a technique for effecting multitasking over an SCSI bus. Those skilled in the art will recognize yet other embodiments of the invention as described more particularly by the claims which follow.

Having thus described our invention, what we claim as new and desire to secure by Letters Patent is:

1. A method for improving communication efficiency between a host processor connected to an SCSI bus through an adapter, and a plurality of SCSI devices connected to said bus comprising:
   storing arbitration and selection data corresponding to a protocol command phase for a peripheral device in a first set of registers comprising a background state machine;
   arbitrating with said background state machine for access to said SCSI bus using said arbitration data when said bus is free, and establishing a communication link with a physical unit of said peripheral device in accordance with said selection data;
   storing command out data for said selected physical unit of said peripheral device in a second set of registers comprising a foreground state machine for executing a foreground state machine protocol and functions which transfer data to said peripheral device;

executing said foreground state machine protocol whereby said command out data is transferred to said peripheral device; and storing in said background state machine additional arbitration and selection data after said communication link is established and prior to completion of said foreground functions execution, whereby said host processor and adapter having a higher priority than said peripheral device are preset to arbitrate and thereby win access as soon as said foreground execution is complete before any other peripheral device can gain access to said bus.

2. The method according to claim 1, wherein one or more additional protocol phases, including message out, command out, data out, data in, status in, message in are programmed in the background state machine, and executed when the selection is complete.

3. The method according to claim 1 wherein each of said peripheral devices which receives command out data from said second set of registers executes said command out data while another of said peripheral devices are receiving other command out data from said foreground state machine.

4. The method according to claim 3 wherein said peripheral devices arbitrate and gain access to said SCSI bus after all said command out data has been transferred from said adapter to all of said respective peripheral devices, each peripheral device forwarding any requested reply data to said adapter when access to said SCSI bus is obtained.

5. The method of claim 3 wherein at least one of said peripheral devices is a disk memory which receives from said adapter commands data to read data, executes said data, and subsequently forward said read data to said adapter.

6. The method of claim 1 wherein said adapter may be selected during arbitration by said peripheral devices for receiving data commands from a peripheral device.

7. An apparatus for improving the communication efficiency between a host processor and a plurality of peripheral devices connected to an SCSI bus comprising:

an adapter connecting said host processor to said SCSI bus including:

a foreground state machine device for controlling data transfer between a data buffer and said SCSI bus, and for transmitting command out data over a link established between said adapter and a peripheral device;

a busy detector for indicating a bus free condition on said SCSI bus;

a background arbitration state machine device for arbitrating for access to said SCSI bus when said busy detector indicates a bus free conditions, and for establishing a communication link in response to selection function data with a physical unit of a peripheral device, said background state machine device enabling said foreground state machine to transmit said command out data over said link;

a microcontroller connected to said background arbitration device and said foreground state machine device for supplying arbitration, selection data and message out data to said background arbitration device, and, command out data to said foreground state machine device in response to a request from said host processor for access to a peripheral device, said microcontroller supplying subsequent arbitration, selection data and message out data to said background arbitration device prior to completion of transmission of command out data by said foreground device when said host processor has another request for another of said peripheral devices, whereby said background arbitration device is programmed to arbitrate for access for said bus prior to completion of transmission by said foreground state machine of said command out data upon a subsequent busy free condition insuring access to said bus by said host processor, whereby said host processor having a higher priority than other devices connected to said bus is awarded access to said bus.

8. The apparatus of claim 7 wherein said foreground device is reset each time said busy detector indicates a bus free condition.

9. The apparatus of claim 7 wherein said arbitration selection function data indicates whether said adapter is an initiator or a target.

10. The apparatus of claim 7 wherein said microcontroller stores subsequently generated arbitration, and selection data in a queue until said background arbitration device completes establishment of said link.

11. The apparatus of claim 9 wherein said background state machine interrupts said host each time an arbitration is won, indicating said background state machine can accept further arbitration data.

12. An apparatus for improving communication efficiency between a higher priority host processor and a plurality of lower priority peripheral devices connected to an SCSI bus comprising:

an adapter connecting said host processor to said SCSI bus including:

a background state machine for performing a portion of protocol functions for said SCSI bus, including arbitration for access to said SCSI bus, and performing a selection and message out function to establish a communication link with a peripheral device;

a foreground state machine for performing the remaining protocol functions once said link has been established, including a command out function to transfer data from said adapter to said peripheral device;

a microcontroller for providing data to said background state machine and foreground state machine for performing said protocol functions said microcontroller supplying subsequent arbitration, selection and message out data to said background state machine once said communication link is established, whereby said adapter is conditioned to arbitrate for access to said bus while said foreground state machine completes said remaining protocol functions with said peripheral device, permitting said higher priority host processor and adapter to arbitrate for and win access to said SCSI bus.

13. The apparatus of claim 12 further comprising a data queue for storing selection data and arbitration data for additional tasks initiated by said host processor.

14. The apparatus of claim 13 wherein said microcontroller transfers said arbitration data and selection data from said data queue to said background state machine each time said background state machine successfully wins an arbitration.

* * * * *